Patented Oct. 16, 1951

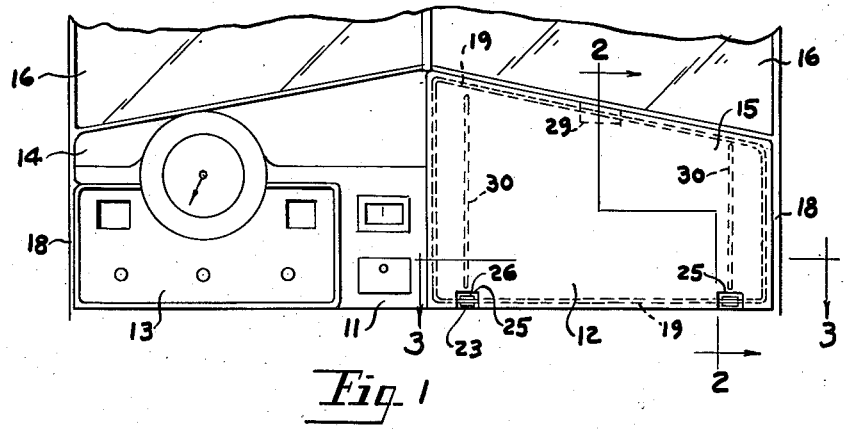
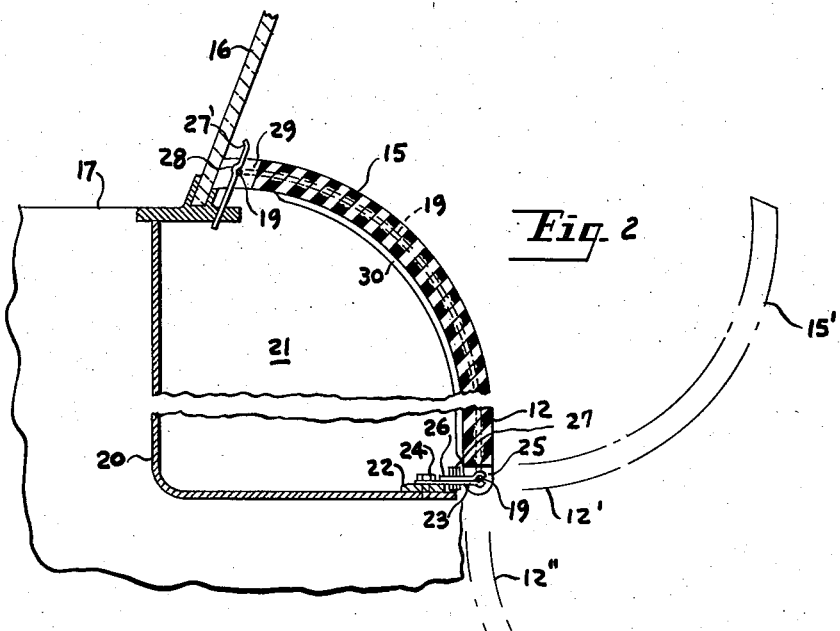
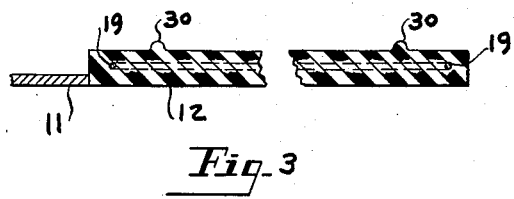
INVENTORS.
EDMUND M. SLOMAN.
GRACE JEFFRIES COGAN.

2,571,627

UNITED STATES PATENT OFFICE 2,571,627

VEHICLE DASHBOARD CONSTRUCTION

Edmund M. Sloman and Grace Jeffries Cogan, Detroit, Mich.

Application November 12, 1949, Serial No. 126,782

7 Claims. (Cl. 180—90)

This invention relates to vehicle dashboards, and more particularly to a dashboard construction including a resilient non-metallic portion.

It is the object of the present invention to provide a novel dashboard construction which includes a formed metallic or rigid portion to receive the instrument panel, and a resilient non-metallic portion forming the remainder of said dashboard.

It is the further object of this invention to provide a resilient non-metallic dashboard element which occupies at least one-half of the dashboard remote from the instrument panel, with said non-metallic element forming a hinged glove compartment door.

It is the further object of this invention to provide a dashboard construction including a resilient non-metallic portion constructed of formed rubber or other resilient material.

These and other objects will be seen from the following specification and claims in conjunction with the appended drawing in which:

Fig. 1 is a fragmentary front elevational view of the vehicle dashboard embodying the present invention.

Fig. 2 is a section on line 2—2 of Fig. 1; and

Fig. 3 is a section on line 3—3 of Fig. 1.

It will be understood that the drawing illustrates merely a preferred embodiment of the present invention and that other embodiments are contemplated within the scope of the claims hereafter set out.

Referring to the drawing the dashboard includes the metallic portion 11 which supports and includes the conventional instrument panel generally indicated at 13. The dashboard also includes the formed non-metallic resilient and yielding portion 12.

The metallic or rigid portion of the dashboard also includes the upper metallic ornamental portion 14, whereas the non-metallic portion of the dashboard also includes the upper non-metallic ornamental portion 15.

The vehicle windshield portions are generally indicated at 16 with a portion of the vehicle hood shown at 17 in Figure 2. The framework 18 as shown in Figure 1 bounds the dashboard 11—12 as well as windshield elements 16.

The resilient portion of the dashboard 12—15 which preferably extends throughout one-half of the dashboard remote from the instrument panel, may of course extend throughout a larger portion thereof if desired, and possibly extend through the ornamental portion 14 corresponding to the instrument panel 13 shown in Figure 1.

The resilient yielding portion of the dashboard 12—15 is preferably constructed or moulded in rubber so as to take the general shape indicated in Figure 2 for example.

In the present embodiment the dashboard element 12—15 is generally arcuate and is preferably moulded to correspond to the general contour of the particular dashboard of which it forms a part. The hollow generally rectangular shaped metallic frame 19 of the arcuate form shown in Fig. 2 is preferably moulded within the resilient dashboard element and is substantially completely covered thereby in order to add rigidity. It is contemplated however that the moulded rubber or other composition dashboard element could be constructed of such stiffness that this framework could be omitted.

It is also contemplated as a part of the present invention that the resilient dashboard element be hingedly mounted and pivotal to either or both of the dotted line positions shown in Fig. 2, to thereby provide access to the hollow glove compartment 20 arranged forwardly of said hinged dashboard element. In other words the glove compartment may be constructed co-extensive with the resilient dashboard element so that in effect this portion of the dashboard which is resilient corresponds to a glove compartment door which also functions as the vehicle dashboard.

Thus the resilient dashboard element 12—15 forms the arcuate closure for the space 21 within glove compartment 20.

It is contemplated that the resilient panel which actually forms a part of the vehicle dashboard, not being an element attachable to an existing dashboard, will be suitably hinged or otherwise pivotally mounted either at its lower longitudinal edge or along its upper longitudinal edge. However in the preferred embodiment which is shown in the drawing the dashboard element 12—15 is hingedly mounted at its lower longitudinal edge to the floor of the glove compartment 20 as shown in Fig. 2.

A pair of spaced mounting washers 22 are positioned upon the forward portion of the glove compartment floor adjacent its ends and are secured in position by the bolts 24 which also retain the outwardly projecting formed hinge elements 23.

As shown in Fig. 1 dashboard element 12 has a pair of cutaway portions 25 which receive hinge elements 23 and which expose portions of the frame 19 which are swivelly mounted upon said hinge elements. The upper portions of the hinge 26 are secured to lower hinge elements 23 by the bolts 27, with the outer portions of hinge elements 26 cooperatively and retainingly engaging the exposed portions of reinforcing wire 19, to thereby provide a suitable pivot for dashboard element 12—15.

It is contemplated that there may be numerous types of hinge elements employed for the above purpose. Under some conditions it may be desirable to omit all of the wire frame 19 with the exception of the lower longitudinal shaft corresponding to the lower edge of dashboard element 12. In this case the same hinge arrangement may be employed as shown in Fig. 2. On the other hand the frame element 19 could extend slightly beyond the upright edges of dashboard element 12 and rotatively fit within socket formations to thereby obtain the same hinge effect.

Referring to Fig. 2 there is shown a central upright resilient retaining clip 27' which projects upwardly from the vehicle frame in substantial parallel relation to windshield 16, which clip has the arcuate formation 28.

As shown in Figs. 1 and 2 there is a central slot 29 formed in the upper portion of resilient dashboard element 15 which receives retaining clip 27' and which exposes a portion of the frame 19 adapted for cooperative retaining registry within arcuate portion 28 of said clip. By this construction the resilient yielding dashboard element 12—15 will be retained in the position shown, and may be opened merely by manual pressure upon the upper end of clip 27', or on the other hand merely by lifting against the resiliency of said clip.

It is contemplated that the present resilient formed, preferably rubber or other composition, elements 12—15 form an integral part of the vehicle dashboard as distinguished from a resilient element which might be mounted upon the outside of the conventional metallic dashboard, or as distinguished from a resilient element which might be mounted within a recess formed within the conventional metallic dashboard.

It is also contemplated that the yielding dashboard element may be employed if desired as the door for a glove compartment arranged forwardly of the general plane of the dashboard.

It is also contemplated as a part of the present invention that the moulded resilient dashboard element 12—15 have formed therein a plurality of reinforcing ribbing elements such as indicated at 30 in Fig. 2 to add to the rigidity thereof.

It is also contemplated as a part of the present invention that in cases where the dashboard of an automobile is made of a rigid substance or material other than metal, the term "metallic" as used in this application shall be deemed to refer to and to include such other rigid substance or material.

Having described our invention, reference should now be had to the claims which follow for determining the scope thereof.

We claim:

1. A vehicle dashboard consisting of a formed metallic portion upon one side thereof adapted to receive an instrument panel, and a resilient non-metallic similarly formed portion upon its other side, said non-metallic portion including a hollow formed imbedded wire frame which supports, and over which is moulded, a resilient rubber element, which is similarly shaped to said metallic portion and blends therewith.

2. A vehicle dashboard consisting of a formed metallic portion upon one side thereof adapted to receive an instrument panel, and a resilient non-metallic similarly formed portion upon its other side, said non-metallic portion including a wire shaft which supports, and over which is moulded, a resilient rubber element similarly shaped to said metallic portion and which blends therewith, said shaft providing means permitting a pivotal mounting for said non-metallic portion.

3. A vehicle dashboard consisting of a formed metallic portion upon one side thereof to receive the instrument panel, and a resilient non-metallic similarly formed portion upon its other side, said non-metallic portion including a hollow similarly formed wire frame hingedly mounted upon the dash, and a correspondingly formed relatively thick rubber cover moulded over said frame and arranged in alignment with said metallic portion.

4. A vehicle dashboard consisting of a formed metallic portion upon one side thereof to receive the instrument panel and a resilient non-metallic similarly formed portion upon its other side, and a glove compartment arranged forwardly of and substantially co-extensive with said non-metallic portion, the latter including a hollow similarly formed wire frame hingedly mounted upon said glove compartment.

5. In a vehicle, a glove compartment substantially co-extensive with one-half of the vehicle dashboard and arranged forwardly thereof, a hollow formed wire frame hingedly mounted upon said glove compartment, and a formed soft rubber glove compartment door moulded over said frame and comprising substantially one-half of the vehicle dashboard.

6. In a vehicle, a glove compartment arranged forwardly of the vehicle dashboard, a hollow formed wire frame hingedly mounted upon said glove compartment, and a formed soft rubber glove compartment door moulded over said frame, and conforming to the general shape of said dashboard.

7. A vehicle dashboard consisting of a formed metallic portion upon one side thereof adapted to receive an instrument panel, and a resilient non-metallic similarly formed portion upon its other side, said non-metallic portion including a hollow formed imbedded wire frame which supports, and over which is moulded, a resilient plastic element, which is similarly shaped to said metallic portion and blends therewith.

EDMUND M. SLOMAN.
GRACE JEFFRIES COGAN.

REFERENCES CITED

The following references are of record in the file of this patent:

UNITED STATES PATENTS

| Number | Name | Date |
| --- | --- | --- |
| 2,070,760 | Straith | Feb. 16, 1937 |
| 2,127,323 | Breer | Aug. 16, 1938 |
| 2,375,567 | Luton | May 8, 1945 |